US011929556B2

(12) United States Patent
Gamalski et al.

(10) Patent No.: US 11,929,556 B2
(45) Date of Patent: Mar. 12, 2024

(54) MULTI-BEAM PASSIVELY-SWITCHED PATCH ANTENNA ARRAY

(71) Applicant: Raytheon Company, Waltham, MA (US)

(72) Inventors: Andrew D. Gamalski, Tucson, AZ (US); Andrew K. Brown, Oro Valley, AZ (US)

(73) Assignee: Raytheon Company, Tewksbury, MA (US)

( * ) Notice: Subject to any disclaimer, the term of this patent is extended or adjusted under 35 U.S.C. 154(b) by 854 days.

(21) Appl. No.: 17/014,151

(22) Filed: Sep. 8, 2020

(65) Prior Publication Data

US 2022/0077594 A1 Mar. 10, 2022

(51) Int. Cl.

*H01Q 21/06* (2006.01)
*H01Q 1/38* (2006.01)
*H01Q 3/36* (2006.01)
*H01Q 9/04* (2006.01)
(Continued)

(52) U.S. Cl.

CPC ............. *H01Q 21/065* (2013.01); *H01Q 1/38* (2013.01); *H01Q 3/36* (2013.01); *H01Q 9/0457* (2013.01); *H01Q 21/24* (2013.01)

(58) Field of Classification Search

None
See application file for complete search history.

(56) References Cited

U.S. PATENT DOCUMENTS 3,108,278 A 10/1963 Walter
3,268,896 A 8/1966 Spitz
3,721,988 A 3/1973 Schwartz et al.
(Continued)

FOREIGN PATENT DOCUMENTS

CN 102403576 A 4/2012
EP 1071161 A1 * 1/2001
(Continued)

OTHER PUBLICATIONS

Xian-Jing Lin et al., "High Isolation Dual-Polarized Patch Antenna with Hybrid Ring Feeding"; International Journal of Antennas and Propagation; vol. 2017; article ID 6193102; published in the year 2017. (Year: 2017).*
(Continued)

*Primary Examiner* — Bernarr E Gregory

(57) ABSTRACT

An apparatus includes multiple patch antenna elements configured to transmit multiple electromagnetic beams in multiple beam directions. The apparatus also includes multiple inputs each configured to receive one of multiple input signals, where each input signal is associated with one of the electromagnetic beams. The apparatus further includes multiple phase-tapered splitters each configured to receive one of the input signals, divide the received input signal into a set of sub-signals, and provide a phase taper that adjusts phases of at least some of the sub-signals in the set of sub-signals. Different phase tapers are associated with different ones of the beam directions. In addition, the apparatus includes multiple 90° hybrid transformers each configured to receive sub-signals associated with different ones of the input signals, isolate the received sub-signals from each other, and provide the isolated sub-signals to one of the patch antenna elements.

20 Claims, 5 Drawing Sheets

(51) Int. Cl.
*H01Q 21/24* (2006.01)
*H01Q 21/00* (2006.01)

(56) References Cited

U.S. PATENT DOCUMENTS

| | | | | |
|---|---|---|---|---|
| 4,503,436 | A * | 3/1985 | Cramer, Jr. | H01Q 21/065 342/356 |
| 4,543,579 | A | 9/1985 | Teshirogi | |
| 4,864,311 | A * | 9/1989 | Bennett | H01Q 3/40 342/368 |
| 5,163,176 | A | 11/1992 | Flumerfelt et al. | |
| 5,686,926 | A | 11/1997 | Kijima et al. | |
| 5,943,012 | A * | 8/1999 | Sinclair | H01Q 21/30 342/361 |
| 6,011,512 | A | 1/2000 | Cohen | |
| 6,456,238 | B1 | 9/2002 | Posey | |
| 7,239,219 | B2 | 7/2007 | Brown et al. | |
| 7,865,152 | B2 | 1/2011 | Brown | |
| 2010/0261440 | A1* | 10/2010 | Corman | H01Q 3/36 343/756 |
| 2013/0214974 | A1 | 8/2013 | Nagaishi et al. | |
| 2013/0314280 | A1* | 11/2013 | Maltsev | H01Q 3/40 342/368 |
| 2014/0218264 | A1 | 8/2014 | Kawate | |
| 2018/0269586 | A1 | 9/2018 | Kawahata | |
| 2019/0058251 | A1 | 2/2019 | Kawahata | |

FOREIGN PATENT DOCUMENTS

| | | | |
|---|---|---|---|
| EP | 1071161 | A1 | 1/2001 |
| KR | 10-2019274 | B1 | 9/2019 |

OTHER PUBLICATIONS

Z. Tang, J. Liu, Y.-M. Cai, J. Wang and Y. Yin, "A Wideband Differentially Fed Dual-Polarized Stacked Patch Antenna With Tuned Slot Excitations," in IEEE Transactions on Antennas and Propagation, vol. 66, No. 4, pp. 2055-2060, Apr. 2018, doi: 10.1109/TAP.2018.2800764. (Year: 2018).*

International Search Report and Written Opinion of the International Searching Authority dated Nov. 26, 2021 in connection with International Patent Application No. PCT/US2021/016656, 12 pages.

Adamidis et al., "Design and Implementation of a 4×4 Butler-Matrix Switched-Beam Antenna Array at the Microwave Communications and Electromagnetic Applications Lab of the Technological Educational Institute of Crete," 2005, 6 pages.

Burgos-Garcia et al., "Digital Monopulse Receivers for Phase Modulated Signals," Proceedings of the International Radar Conference, Oct. 2003, 6 pages.

Demetriadou et al., "Slim Luneburg lens for antenna applications," Optics Express, vol. 19, No. 21, Oct. 2011, 10 pages.

Vashist et al., "A Review on the Development of Rotman Lens Antenna," Review Article, Chinese Journal of Engineering, vol. 2014, Article ID 385385, Jul. 2014, 9 pages.

* cited by examiner

MULTI-BEAM PASSIVELY-SWITCHED PATCH ANTENNA ARRAY

TECHNICAL FIELD

This disclosure relates generally to radar, communication, and other systems. More specifically, this disclosure relates to a multi-beam passively-switched patch antenna array.

BACKGROUND

In some systems, antenna arrays are used to transmit different high-gain beams in different directions at different times. This may be useful in various applications, such as radars and communication systems. Some approaches use electronic beam steering to change the way in which input signals are provided to antenna arrays in order to modify how the antenna arrays transmit outgoing beams. Other approaches use active switching with field effect transistor (FET) switches combined with multiple phase-tapered splitters, where the switching action of the FETs changes which phase-tapered splitter receives the input signal and thereby changes the resulting beam angle.

SUMMARY

This disclosure provides a multi-beam passively-switched patch antenna array.

In a first embodiment, an apparatus includes multiple patch antenna elements configured to transmit multiple electromagnetic beams in multiple beam directions. The apparatus also includes multiple inputs each configured to receive one of multiple input signals, where each input signal is associated with one of the electromagnetic beams. The apparatus further includes multiple phase-tapered splitters each configured to receive one of the input signals, divide the received input signal into a set of sub-signals, and provide a phase taper that adjusts phases of at least some of the sub-signals in the set of sub-signals. Different phase tapers are associated with different ones of the beam directions. In addition, the apparatus includes multiple 90° hybrid transformers each configured to receive sub-signals associated with different ones of the input signals, isolate the received sub-signals from each other, and provide the isolated sub-signals to one of the patch antenna elements.

In a second embodiment, a system includes at least one signal source and a multi-beam passively-switched patch antenna array. The at least one signal source is configured to generate multiple input signals. The patch antenna array includes multiple patch antenna elements configured to transmit multiple electromagnetic beams in multiple beam directions. The patch antenna array also includes multiple inputs each configured to receive one of the input signals, where each input signal is associated with one of the electromagnetic beams. The patch antenna array further includes multiple phase-tapered splitters each configured to receive one of the input signals, divide the received input signal into a set of sub-signals, and provide a phase taper that adjusts phases of at least some of the sub-signals in the set of sub-signals. Different phase tapers are associated with different ones of the beam directions. In addition, the patch antenna array includes multiple 90° hybrid transformers each configured to receive sub-signals associated with different ones of the input signals, isolate the received sub-signals from each other, and provide the isolated sub-signals to one of the patch antenna elements.

In a third embodiment, a method includes receiving a first input signal, dividing the first input signal into a first set of multiple sub-signals, and adjusting phases of at least some of the sub-signals in the first set of sub-signals according to a first phase taper. The method also includes feeding the phase-adjusted first set of sub-signals to multiple patch antenna elements through multiple 90° hybrid transformers and transmitting a first electromagnetic beam in a first beam direction using the patch antenna elements based on the phase-adjusted first set of sub-signals. The method further includes receiving a second input signal, dividing the second input signal into a second set of multiple sub-signals, and adjusting phases of at least some of the sub-signals in the second set of sub-signals according to a second phase taper. In addition, the method includes feeding the phase-adjusted second set of sub-signals to the patch antenna elements through the 90° hybrid transformers and transmitting a second electromagnetic beam in a second beam direction using the patch antenna elements based on the phase-adjusted second set of sub-signals. The 90° hybrid transformers isolate the first and second sets of sub-signals from each other. The first and second beam directions are based on the first and second phase tapers, respective.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
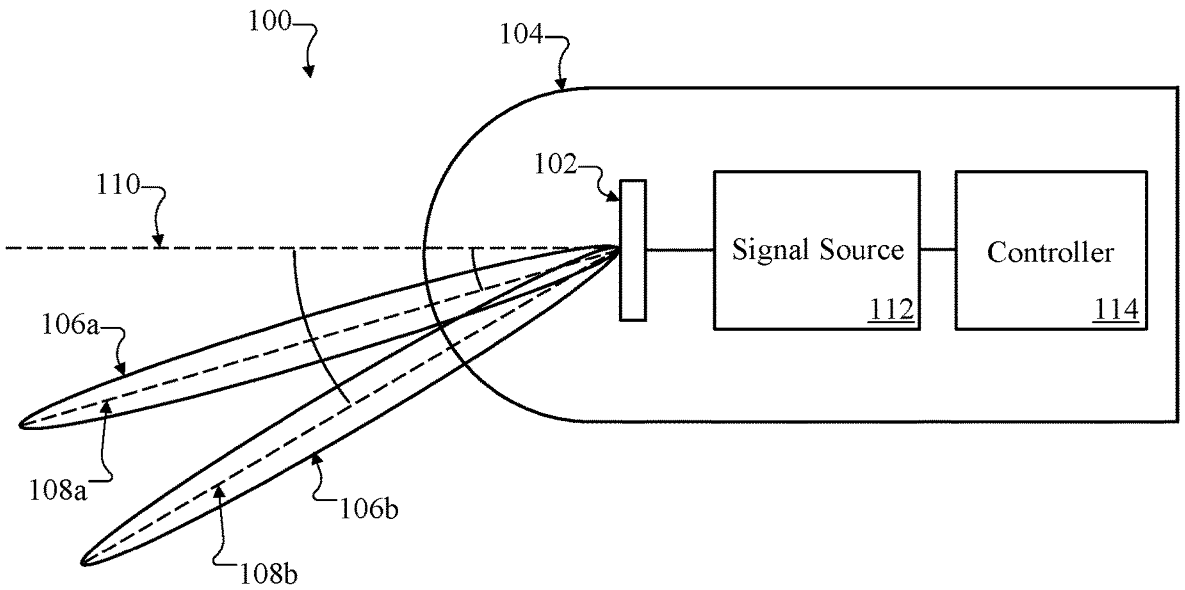
FIG. 1 illustrates an example system that uses a multi-beam passively-switched patch antenna array in accordance with this disclosure.

FIGS. 1 through 4E, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, in some systems, antenna arrays are used to transmit different high-gain beams in different directions at different times. This may be useful in various applications, such as radars and communication systems. Some approaches use electronic beam steering to change the way in which input signals are provided to antenna arrays in order to modify how the antenna arrays transmit outgoing beams. Other approaches use active switching with field effect transistor (FET) switches combined with multiple phase-tapered splitters, where the switching action of the FETs changes which phase-tapered splitter receives the input signal and thereby changes the resulting beam angle. However, these approaches may require a considerable amount of space to be implemented, which can limit or prevent their use in volume-constrained applications. These approaches also often cannot be used with mono-pulse tracking or permit scaling to arbitrary antenna array sizes. Mono-pulse tracking is a technique used to encode radio frequency (RF) signals to provide accurate directional information, which may be needed or desired in certain applications.

This disclosure provides a multi-beam passively-switched patch antenna array. As described in more detail below, the multi-beam passively-switched patch antenna array includes an array of patch antenna elements and circuitry configured to provide different signals to different antenna elements of the array. The circuitry includes phase-tapered splitters that are used to divide each of multiple input signals into multiple sub-signals, where the sub-signals are provided to different antenna elements of the array. The phase tapering is designed to achieve a desired beam direction for one of multiple output beams produced by the array. The circuitry also includes hybrid transformers that isolate the sub-signals for different input signals from one another prior to reaching the antenna elements of the array. This enables a system to provide one input signal to the circuitry for use in transmitting a beam in a first desired direction and to provide another input signal to the circuitry for use in transmitting another beam in a second desired direction.

In this way, the multi-beam passively-switched patch antenna array supports the transmission of different beams in different directions in a compact package (such as a thin flat package). Moreover, this is accomplished passively in a manner that reduces or eliminates the need for electronic beam steering or active switching. Further, the patch antenna array can be used in mono-pulse tracking applications and can be scaled to arbitrary antenna array sizes. In addition, in some embodiments, the patch antenna array can be fabricated using common printed circuit board (PCB) materials, such as dielectric materials and etched metals, which can significantly reduce the cost and manufacturing requirements of the array.

One or more instances of the multi-beam passively-switched patch antenna array may be used in any suitable applications. Example applications can include various secure (high gain) communications applications, antennas used for seeker applications, and applications in drones or other flight vehicles. Other example applications can include automotive radar applications, such as forward-look and side-look beams in single passive package (utilizing two antennas, one on each side of the vehicle), or applications in 5G antennas (utilizing a semi- or non-gimbaled two-beam antenna for communications with two base stations).

FIG. 1 illustrates an example system 100 that uses a multi-beam passively-switched patch antenna array 102 in accordance with this disclosure. The patch antenna array 102 is positioned in a radome 104, and the patch antenna array 102 can be used to transmit multiple beams 106*a*-106*b*. In this example, the beams 106*a*-106*b* are transmitted from the patch antenna array 102 in different directions. For example, the beam 106*a* is transmitted along a first axis 108*a* that has a first angle relative to a central axis 110 of the patch antenna array 102, and the beam 106*b* is transmitted along a second axis 108*b* that has a second angle relative to the central axis 110 of the patch antenna array 102. The first axis 108*a* and the central axis 110 may form an angle denoted $\phi$, and the second axis 108*b* and the central axis 110 may form an angle denoted $\theta$. Each angle $\phi$ and $\theta$ may have any suitable value.

As can be seen here, the patch antenna array 102 supports the ability to generate multiple high-gain beams 106*a*-106*b*, which are isolated and can be independently activated as described below. The ability to generate different high-gain beams 106*a*-106*b* and the ability to passively switch between transmitting the beams 106*a*-106*b* can be extremely useful in various applications. Moreover, the patch antenna array 102 supports these functions without requiring electronic beam forming or active switching, which can help to reduce the size, weight, and cost of the patch antenna array 102. Further, the patch antenna array 102 can be used with mono-pulse tracking applications or other applications. In addition, the patch antenna array 102 can independently generate multiple beams 106*a*-106*b* that are separated by a fixed angle within any suitable wavelength or frequency band(s).

In some embodiments, the patch antenna array 102 may represent a circular patch antenna array, and the beams 106*a*-106*b* may represent circularly-polarized beams. In particular embodiments, the beam 106*a* may have a "right hand" circular polarization, and the beam 106*b* may have a "left hand" circular polarization (or vice versa). Note, however, that other designs and operations of the patch antenna array 102 may be used.

In this example, the system 100 additionally includes at least one signal source 112 and a controller 114. The at least one signal source 112 represents a source of input electrical signals that are provided to the patch antenna array 102, where the input signals provide RF power used to generate the beams 106*a*-106*b*. A single source 112 may generate multiple input signals, or different sources 112 may generate different input signals. Each signal source 112 represents any suitable structure configured to generate RF power used to generate at least one beam of electromagnetic energy. The controller 114 controls the operation of the signal source(s) 112 in order to control which input signal is provided to the patch antenna array 102 at any given time. For instance, the controller 114 may cause one input signal to be provided to the patch antenna array 102 (so that a first beam 106*a* is produced) and then cause another input signal to be provided to the patch antenna array 102 (so that a second beam 106*b* is produced). The controller 114 may switch back and forth between the input signals as needed or desired. The controller 114 includes any suitable structure configured to control operation of at least part of the system 100. For example, the controller 114 may include one or more processing devices, such as one or more microprocessors, microcontrollers, digital signal processors (DSPs), field programmable gate arrays (FPGAs), application specific integrated circuits (ASICs), or discrete elements.

Although FIG. 1 illustrates one example of a system 100 that uses a multi-beam passively-switched patch antenna array 102, various changes may be made to FIG. 1. For example, one or more instances of the patch antenna array 102 may be used in any other suitable applications or systems. Also, the number of patch antenna arrays 102, the number of antenna elements in each patch antenna array 102, the size of each patch antenna array 102, and the size(s) of the antenna elements in each patch antenna array 102 can be selected in order to support desired operation in a specific application.

Figure 2:
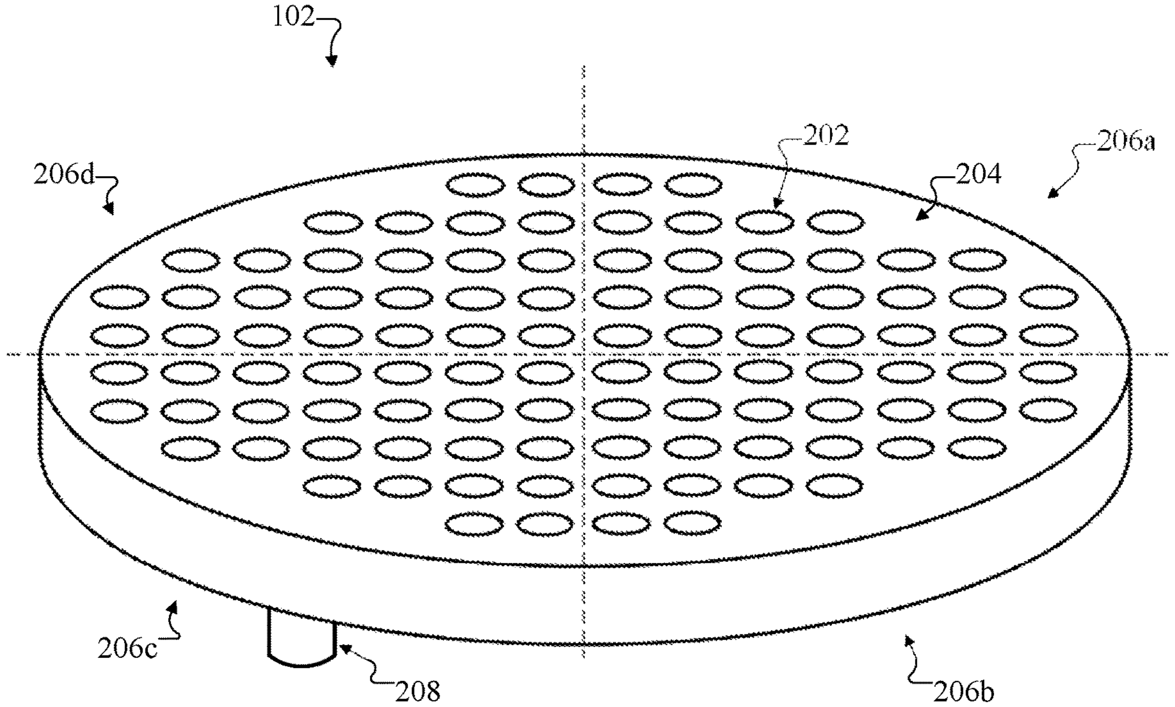
FIG. 2 illustrates an example multi-beam passively-switched patch antenna array in accordance with this disclosure.

FIG. 2 illustrates an example multi-beam passively-switched patch antenna array 102 in accordance with this disclosure. For ease of explanation, the patch antenna array 102 shown in FIG. 2 may be described as being used in the system 100 of FIG. 1. However, the patch antenna array 102 may be used in any other suitable manner.

As shown in FIG. 2, the patch antenna array 102 includes patch antenna elements 202. Each patch antenna element 202 is configured to receive an electrical signal and to radiate electromagnetic energy based on the received signal and/or to receive electromagnetic energy and provide an electrical signal based on the received electromagnetic energy. Each patch antenna element 202 may be formed from any suitable material(s), such as one or more metals or other conductive material(s). Each patch antenna element 202 may also be formed in any suitable manner, such as by depositing and etching the material(s) forming the patch antenna element 202. In some embodiments, the patch antenna elements 202 may be formed on a printed circuit board. Each patch antenna element 202 may further have any suitable size, shape, and dimensions. In this example, the patch antenna elements 202 are generally circular, although other shapes may be used. Note that the patch antenna array 102 can be designed to provide a large antenna gain for each of the beams 106*a*-106*b* produced by the patch antenna array 102, such as an antenna gain of about 21 decibels or more. However, the antenna gain can vary depending on various factors, such as the number of antenna elements 202 in the array 102 and the size of the array 102. The patch antenna elements 202 may be separated from one another by any suitable material(s), such as one or more oxides, insulators, or other dielectric material(s).

The patch antenna elements 202 are positioned over a stack 204 of additional layers. The stack 204 includes circuitry that can be used as described below to provide electrical signals to the patch antenna elements 202. The electrical signals can be processed using the circuitry in order to cause the patch antenna elements 202 to generate and radiate different beams 106*a*-106*b* in desired directions.

In some embodiments, the patch antenna array 102 may be divided into quadrants 206*a*-206*d* or other sections, and input signals can be provided to different quadrants of the patch antenna array 102 (although this need not be the case). In the example shown in FIG. 2, each quadrant 206*a*-206*d* includes twenty-six patch antenna elements 202, although other numbers of patch antenna elements 202 may be used. The use of quadrants 206*a*-206*d* may, in some applications, support the use of mono-pulse tracking, which often involves the use of four channels (one per quadrant) along with the use of phases of +90° and −90° in opposite quadrants.

In this example, the patch antenna array 102 additionally includes at least one projection 208 extending from the stack 204. The projection 208 may be used to help ensure that the patch antenna array 102 is installed with a correct orientation in a larger device or system. For example, installing the patch antenna array 102 upside down or otherwise rotated in the system 100 of FIG. 1 would cause the beams 106*a*-106*b* to radiate from the patch antenna array 102 in the wrong directions. The projection 208 can help to ensure that the patch antenna array 102 is installed in a proper orientation so that the beams 106*a*-106*b* radiate from the patch antenna array 102 in the desired directions. Note, however, that any other suitable mechanism may be used to identify a proper orientation of the patch antenna array 102. Also note that the ability to rotate the patch antenna array 102 may be desired in some cases.

While the patch antenna array 102 here is shown as having a generally flat circular disc shape, the patch antenna array 102 may have any other suitable form.

Also, the patch antenna array 102 may be packaged in any suitable manner. For example, the patch antenna array 102 may be shaped like a circular disc and have a diameter of about 2.0 inches (about 50.8 millimeters) or less and a thickness of about 0.25 inches (about 6.35 millimeters) or less. However, these are examples only, and other packages for the patch antenna array 102 may be used.

Although FIG. 2 illustrates one example of a multi-beam passively-switched patch antenna array 102, various changes may be made to FIG. 2. For example, the sizes, shapes, and dimensions of the patch antenna array 102 and each of its individual components may vary as needed or desired. Also, the patch antenna array 102 may include any suitable number and arrangement of patch antenna elements 202.

Figure 3:
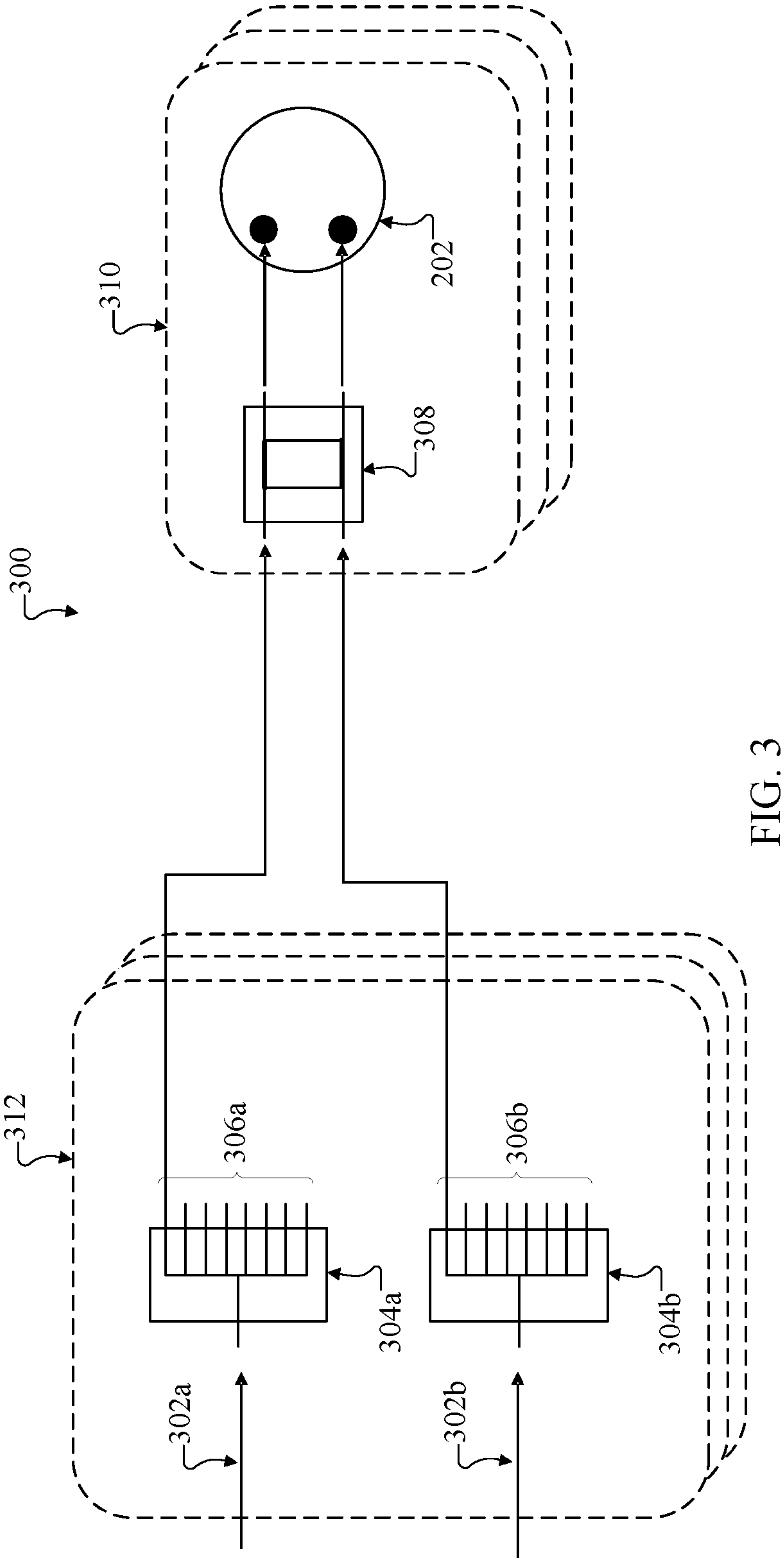
FIG. 3 illustrates an example functional architecture of a multi-beam passively-switched patch antenna array in accordance with this disclosure.

FIG. 3 illustrates an example functional architecture 300 of a multi-beam passively-switched patch antenna array 102 in accordance with this disclosure. For ease of explanation, the functional architecture 300 shown in FIG. 3 may be described as being used in the system 100 of FIG. 1 with a patch antenna array 102 having the form shown in FIG. 2. However, the functional architecture 300 may be used with any other suitable patch antenna array and in any other suitable system.

As shown in FIG. 3, the patch antenna array 102 is configured to receive multiple input signals 302*a*-302*b*. The input signals 302*a*-302*b* represent the electrical signals that provide RF power used to generate the beams 106*a*-106*b*, respectively, transmitted by the patch antenna array 102. For example, the input signals 302*a*-302*b* may represent signals generated by the signal source(s) 112. In order to produce one beam 106*a*, the input signal 302*a* can be provided to the patch antenna array 102. In order to produce another beam 106*b*, the input signal 302*b* can be provided to the patch antenna array 102. This enables passive switching of the patch antenna array 102 by controlling which input signal 302*a* or 302*b* provides RF power to the patch antenna array 102. In some embodiments, this control can be provided by the controller 114 controlling which input signal 302*a* or 302*b* is provided to the patch antenna array 102 by the signal source(s) 112.

Each input signal 302*a*-302*b* is provided to a respective phase-tapered splitter 304*a*-304*b*. The phase-tapered splitters 304*a*-304*b* divide the input signals 302*a*-302*b* into sets of sub-signals 306*a*-306*b*, respectively. For example, each phase-tapered splitter 304*a*-304*b* may equally or unequally divide one of the input signals 302*a*-302*b* into the sub-signals 306*a*-306*b* (which may have equal or unequal power). Each phase-tapered splitter 304*a*-304*b* can also adjust the phases of the sub-signals 306*a*-306*b* so that the resulting beams 106*a*-106*b* produced by the patch antenna array 102 are transmitted in desired directions. This can be accomplished in various ways, such as by designing the phase-tapered splitters 304*a*-304*b* so that the sub-signals 306*a*-306*b* travel through conductive paths of different lengths before reaching the patch antenna elements 202. The phase taper provided by each phase-tapered splitter 304*a*-304*b* translates into the beam angle of the resulting beam 106*a*-106*b*. Thus, for instance, the beam 106*a* at an angle $\phi$ can be produced by the phase-tapered splitter 304*a* providing an electrical phase taper denoted $\alpha$ per row of patch antenna elements 202, and the beam 106*b* at an angle $\theta$ can be produced by the phase-tapered splitter 304*b* providing an electrical phase taper of 13 per row of patch antenna elements 202. The phase-tapered splitters 304*a*-304*b* may also generate circular polarizations in different directions ("right hand" versus "left handed") for the different beams 106*a*-106*b*. Each phase-tapered splitter 304*a*-304*b* includes any suitable structure configured to split an input signal and adjust phases of the resulting sub-signals.

One of the sub-signals 306*a* can be provided to each patch antenna element 202 of the patch antenna array 102, and one of the sub-signals 306*b* can be provided to each patch antenna element 202 of the patch antenna array 102. Prior to reaching the patch antenna element 202, each pair of one sub-signal 306*a* and one sub-signal 306*b* is provided to a 90° hybrid transformer 308. Depending on which input signal 302*a* or 302*b* is being received, the 90° hybrid transformer 308 allows one of the sub-signals 306*a* or 306*b* to be provided to the associated patch antenna element 202 of the patch antenna array 102. The 90° hybrid transformer 308 also splits the received sub-signal 306*a* or 306*b* (typically equally), provides one portion of the received sub-signal 306*a* or 306*b* to one input of the patch antenna element 202, and provides another portion of the received sub-signal 306*a* or 306*b* to another input of the patch antenna element 202. The two portions of the sub-signal 306*a* or 306*b* are out-of-phase, namely one portion of the sub-signal 306*a* or 306*b* is 90° out-of-phase with the other portion of the sub-signal 306*a* or 306*b*. Overall, the 90° hybrid transformer 308 provides isolation between the two sub-signals 306*a*, 306*b* and ensures that one sub-signal does not affect the other. Each 90° hybrid transformer 308 includes any suitable structure configured to isolate sub-signals and ensure that the sub-signals are out-of-phase.

Note that the components illustrated in a dashed box 310 can be replicated multiple times, such as once for each antenna element 202 in a quadrant 206*a*-206*d* or other portion of the patch antenna array 102. All of these antenna elements 202 may be fed by outputs of the same phase-tapered splitters 304*a*-304*b*. A dashed box 312 in FIG. 3 indicates that the phase-tapered splitters 304*a*-304*b* may be implemented in a different portion of the patch antenna array 102, such as in other layers of the patch antenna array 102, although this need not be the case. The dashed box 312 also indicates that the phase-tapered splitters 304*a*-304*b* may be replicated multiple times, such as once for each quadrant 206*a*-206*d* or other portion of the patch antenna array 102, where each is used with its own set of hybrid transformers 308 and antenna elements 202. In those embodiments, the same input signals 302*a*-302*b* may be provided to each set of phase-tapered splitters 304*a*-304*b*.

Although FIG. 3 illustrates one example of a functional architecture 300 of a multi-beam passively-switched patch antenna array 102, various changes may be made to FIG. 3. For example, each of the phase-tapered splitters 304*a*-304*b* may be used to feed any suitable number of patch antenna elements 202. Also, the components of the patch antenna array 102 may have any suitable layout or arrangement of components.

FIGS. 4A through 4E illustrate an example layout of a multi-beam passively-switched patch antenna array 102 in accordance with this disclosure. For ease of explanation, the layout shown in FIGS. 4A through 4E may be described as being used to implement the functional architecture 300 of FIG. 3 for a patch antenna array 102 having the form shown in FIG. 2, which is used in the system 100 of FIG. 1. However, the layout may be used with any other suitable patch antenna array and functional architecture and in any other suitable system.

Figure 4A:
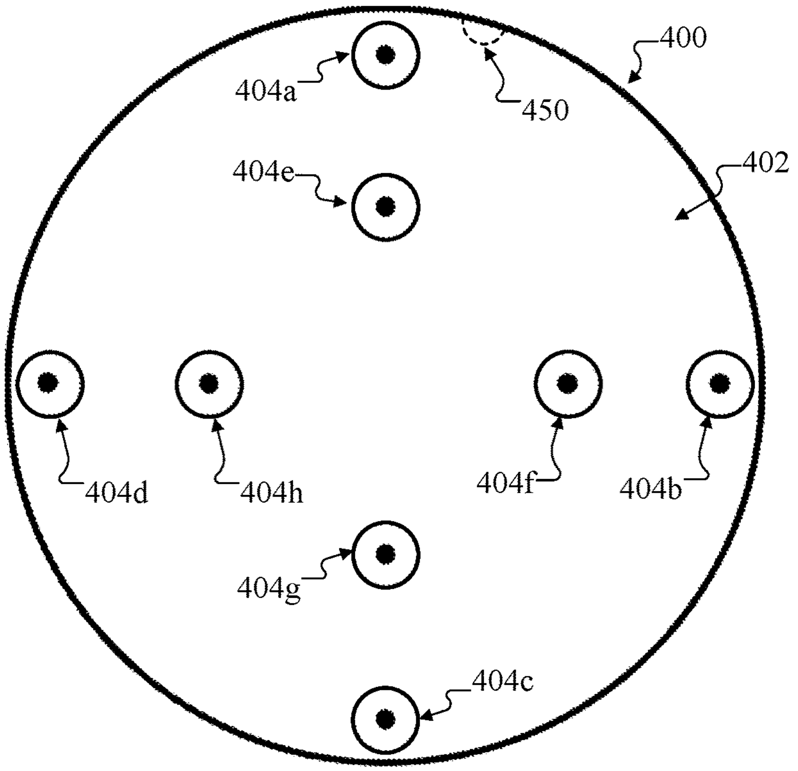
FIGS. 4A through 4E illustrate an example layout of a multi-beam passively-switched patch antenna array in accordance with this disclosure.

As shown in FIG. 4A, a layer 400 of the patch antenna array 102 is used for input/output and includes a substrate 402 and multiple input/output (I/O) connectors 404*a*-404*h*. The substrate 402 may be formed using a printed circuit board or other electrically-insulative material(s). Each I/O connector 404*a*-404*h* can be used to couple the patch antenna array 102 to a larger device or system and to receive an input signal from or provide an output signal to the larger device or system. Each I/O connector 404*a*-404*h* represents any suitable structure configured to receive or provide an electrical signal. Each I/O connector 404*a*-404*h* can be formed from any suitable conductive material(s), such as one or more metals, and in any suitable manner, such as deposition and etching. In some embodiments, the I/O connectors 404*a*-404*h* are configured to mate with spring connectors used in the larger device or system.

Note that there are eight I/O connectors 404*a*-404*h* in this example, which may be used to provide two input signals 302*a*-302*b* to each of four quadrants 206*a*-206*d* of the patch antenna array 102. For instance, the I/O connectors 404*a*-404*d* may be used to provide the same input signal 302*a* to the four quadrants 206*a*-206*d* of the patch antenna array 102, and the I/O connectors 404*e*-404*h* may be used to provide the same input signal 302*b* to the four quadrants 206*a*-206*d* of the patch antenna array 102. However, the layer 400 of the patch antenna array 102 can support any suitable number of inputs/outputs in any suitable arrangement.

Figure 4B:
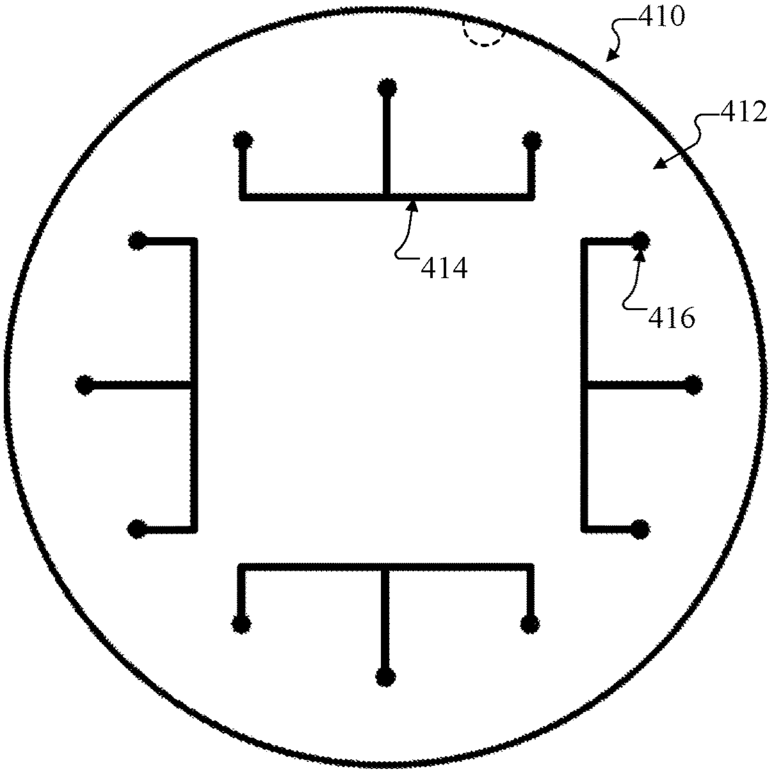
Figure 4C:
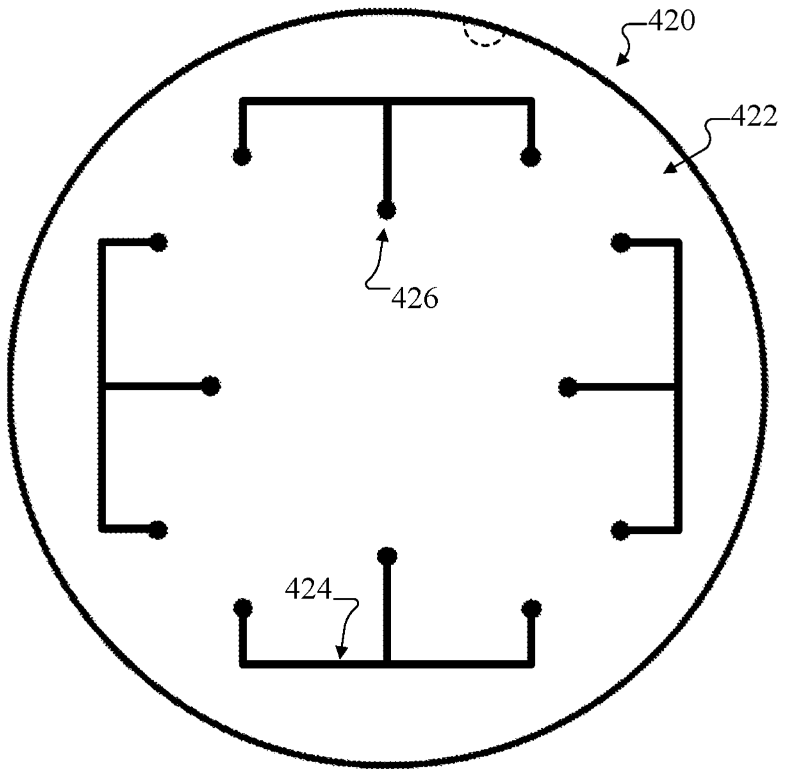

As shown in FIGS. 4B and 4C, two layers 410 and 420 of the patch antenna array 102 are used for implementing the phase-tapered splitters 304*a*-304*b*. The layer 410 includes a substrate 412 and multiple electrical traces 414, and the layer 420 includes a substrate 422 and multiple electrical traces 424. The electrical traces 414 and 424 can be electrically coupled to corresponding I/O connectors 404*a*-404*h* and to other structures using conductive stubs or vias. The electrical traces 414 and 424 act as splitters to divide the input signals 302*a*-302*b* into different sets of sub-signals. This is accomplished by having multiple parallel pathways electrically coupled to each of the I/O connectors 404*a*-404*h*. The desired phase shifts may be obtained using, for instance, electrical traces 414 and 424 of different lengths.

Each electrical trace 414 and 424 represents any suitable pathway configured to transport an electrical sub-signal. Each electrical trace 414 and 424 can be formed from any suitable conductive material(s), such as one or more metals, and in any suitable manner, such as deposition and etching. Each electrical trace 414 and 424 includes multiple connection points 416 and 426, which represent areas where the electrical traces 414 and 424 can be coupled to other layers of the patch antenna array 102 using the conductive stubs or vias.

Figure 4D:
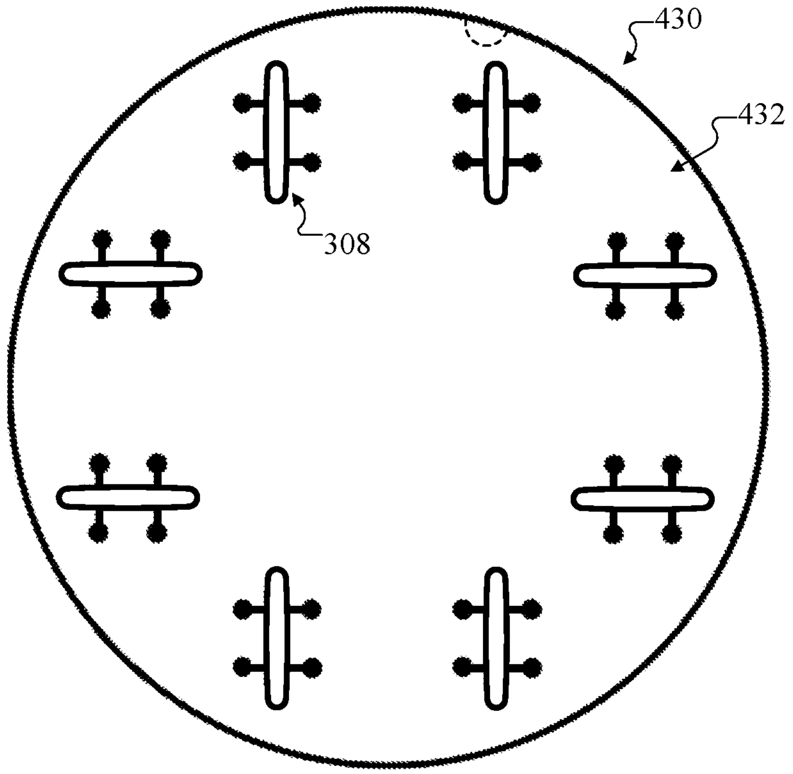

As shown in FIG. 4D, another layer 430 of the patch antenna array 102 includes a substrate 432 and multiple hybrid transformers 308. The hybrid transformers 308 can be electrically coupled to corresponding connection points 416 and 426 in the layers 410 and 420 using the conductive stubs or vias. The substrate 432 may be formed using a printed circuit board or other electrically-insulative material(s). Each hybrid transformer 308 receives one sub-signal 306*a* and one sub-signal 306*b* produced by the layers 410 and 420 at different times. Each hybrid transformer 308 also splits the received sub-signal 306*a* or 306*b* (depending on which input signal 302*a* or 302*b* is currently being received) and isolates the sub-signals 306*a* and 306*b* from each other.

Figure 4E:
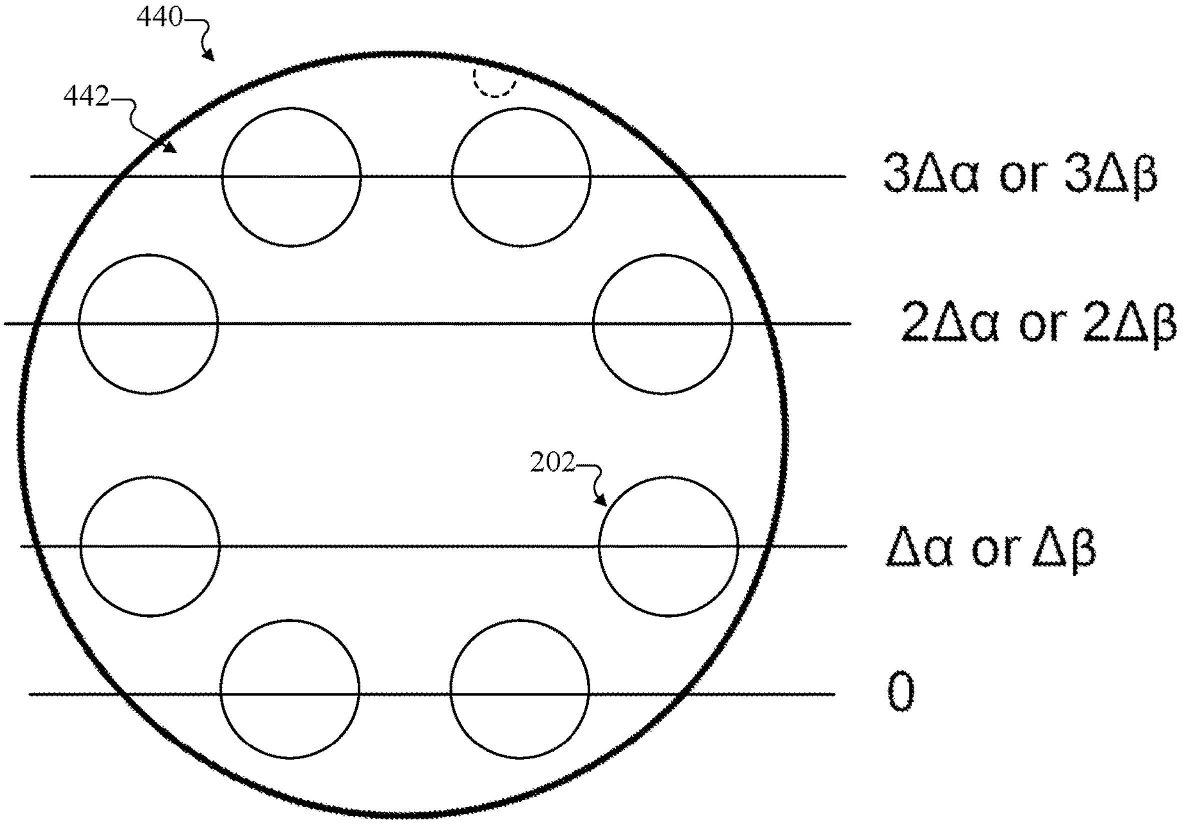

As shown in FIG. 4E, a top layer 440 of the patch antenna array 102 includes the patch antenna elements 202 and a substrate 442. The substrate 442 may be formed using a printed circuit board or other electrically-insulative material(s). Also shown in FIG. 4E is the phase taper used in the patch antenna array 102 in order to achieve desired beam directions. In this example, the phase taper increases moving up each row of patch antenna elements 202, where each row above the first row has an additional phase taper of $\Delta\alpha$ or $\Delta\beta$ (depending on whether the input signal 302*a* or 302*b* is being received) relative to the adjacent lower row. The specific values used as the additional phase tapers $\Delta\alpha$ and $\Delta\beta$ can vary based on the specific angles $\phi$ and $\theta$ being created. Any suitable phase tapers may be used here to achieve desired beam directions.

While not shown here, one or more additional layers would typically be used in the patch antenna array 102. For example, one or more intermediate layers of dielectric material(s), routing electrical pathways, or other components of the patch antenna array 102 may be positioned between the layers 400 and 410, between the layers 410 and 420, between the layers 420 and 430, and/or between the layers 430 and 440. The conductive stubs or vias connecting adjacent ones of the layers 400, 410, 420, 430, and 440 can pass through the dielectric material(s) forming the intermediate layers. Also, one or more protective layer or other layers may coat the exposed surfaces of the top and bottoms layers 440 and 410. In addition, any of the electrical pathways in any of the layers (or intermediate layers) may include tuning stubs, which represent conductive portions of electrical pathways that can be modified (such as trimmed) to adjust the electrical pathways (from the perspective of the electrical signals being transported) as needed to achieve impedance matching between RF transitions.

In addition, note that the design of the patch antenna array 102 enables its fabrication in various ways, including the use of standard PCB processing techniques. Thus, for example, each layer 400, 410, 420, 430, and 440 may be formed by obtaining a suitable printed circuit board and depositing metal(s) or other material(s) on the printed circuit board, etching the metal(s) or other material(s) as needed, and/or attaching components to the printed circuit board. Of course, the patch antenna array 102 may be fabricated in any other suitable manner, and this disclosure is not limited to any particular fabrication technique.

All of the various layers 400, 410, 420, 430, and 440 here include one or more notches 450. In this example, the patch antenna array 102 includes one notch 450 in a specified position. As with the projection 206, the notch or notches 450 may be used to help ensure that the patch antenna array 102 is installed with a correct orientation in a larger device or system, which may help to avoid installing the patch antenna array 102 in an improper orientation that causes the beams 106*a*-106*b* to radiate in undesired directions.

Although FIGS. 4A through 4E illustrate one example of a layout of a multi-beam passively-switched patch antenna array 102, various changes may be made to FIGS. 4A through 4E. For example, the sizes, shapes, and dimensions of the patch antenna array 102 and each of its individual components may vary as needed or desired. Also, a patch antenna array 102 designed in accordance with this disclosure may have any other suitable layout, whether or not implemented using this type of stacked multi-layer approach.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

multiple patch antenna elements collectively configured to transmit multiple electromagnetic beams in multiple beam directions;

multiple inputs each configured to receive one of multiple input signals, each input signal associated with one of the electromagnetic beams;

multiple phase-tapered splitters each configured to receive one of the input signals, divide the received input signal into a set of sub-signals, and provide a phase taper that adjusts phases of at least some of the sub-signals in the set of sub-signals, wherein different phase tapers are associated with different ones of the beam directions; and multiple 90° hybrid transformers each configured to receive sub-signals associated with different ones of the input signals, isolate the received sub-signals from each other, and provide the isolated sub-signals to one of the patch antenna elements.

2. The apparatus of claim 1, wherein:

the patch antenna elements are arranged in four quadrants;

the inputs comprise two inputs for each quadrant, wherein one of the inputs for each quadrant is configured to receive a first of the input signals and one other of the inputs for each quadrant is configured to receive a second of the input signals; and the phase-tapered splitters comprise two phase-tapered splitters for each quadrant, wherein one of the phase-tapered splitters for each quadrant is configured to receive the first input signal and one other of the phase-tapered splitters for each quadrant is configured to receive the second input signal.

3. The apparatus of claim 1, wherein:

the patch antenna elements are positioned over a stack of layers; and the inputs, the phase-tapered splitters, and the 90° hybrid transformers are positioned within the stack of layers.

4. The apparatus of claim 3, wherein the phase-tapered splitters comprise electrical traces in one or more of the layers.

5. The apparatus of claim 1, further comprising at least one of: one or more projections or one or more notches configured to identify a desired installation orientation of the apparatus.

6. The apparatus of claim 1, wherein the phase-tapered splitters are configured to adjust the phases of at least some of the sub-signals in the sets of sub-signals so that a first of the electromagnetic beams is transmitted in a first beam direction and a second of the electromagnetic beams is transmitted in a second beam direction, the first and second beam directions defining a fixed angle.

7. The apparatus of claim 6, wherein:

the first beam direction has a first angle relative to a central axis of the patch antenna elements; and the second beam direction has a second angle relative to the central axis of the patch antenna elements.

8. The apparatus of claim 1, wherein the apparatus is configured to passively switch between transmitting a first of the electromagnetic beams in a first beam direction and transmitting a second of the electromagnetic beams in a second beam direction based on which of the input signals is received.

9. A system comprising:

at least one signal source configured to generate multiple input signals; and a multi-beam passively-switched patch antenna array comprising:

multiple patch antenna elements collectively configured to transmit multiple electromagnetic beams in multiple beam directions;

multiple inputs each configured to receive one of the input signals, each input signal associated with one of the electromagnetic beams;

multiple phase-tapered splitters each configured to receive one of the input signals, divide the received input signal into a set of sub-signals, and provide a phase taper that adjusts phases of at least some of the sub-signals in the set of sub-signals, wherein different phase tapers are associated with different ones of the beam directions; and multiple 90° hybrid transformers each configured to receive sub-signals associated with different ones of the input signals, isolate the received sub-signals from each other, and provide the isolated sub-signals to one of the patch antenna elements.

10. The system of claim 9, wherein:

the patch antenna elements are arranged in four quadrants;

the inputs comprise two inputs for each quadrant, wherein one of the inputs for each quadrant is configured to receive a first of the input signals and one other of the inputs for each quadrant is configured to receive a second of the input signals; and the phase-tapered splitters comprise two phase-tapered splitters for each quadrant, wherein one of the phase-tapered splitters for each quadrant is configured to receive the first input signal and one other of the phase-tapered splitters for each quadrant is configured to receive the second input signal.

11. The system of claim 9, wherein:

the patch antenna elements are positioned over a stack of layers; and the inputs, the phase-tapered splitters, and the 90° hybrid transformers are positioned within the stack of layers.

12. The system of claim 11, wherein the phase-tapered splitters comprise electrical traces in one or more of the layers.

13. The system of claim 11, wherein each layer of the stack of layers comprises a printed circuit board as a substrate.

14. The system of claim 9, wherein the multi-beam passively-switched patch antenna array further comprises at least one of: one or more projections or one or more notches configured to identify a desired installation orientation of the multi-beam passively-switched patch antenna array.

15. The system of claim 9, wherein the phase-tapered splitters are configured to adjust the phases of at least some of the sub-signals in the sets of sub-signals so that a first of the electromagnetic beams is transmitted in a first beam direction and a second of the electromagnetic beams is transmitted in a second beam direction, the first and second beam directions defining a fixed angle.

16. The system of claim 15, wherein:

the first beam direction has a first angle relative to a central axis of the patch antenna array; and the second beam direction has a second angle relative to the central axis of the patch antenna array.

17. The system of claim 9, wherein the multi-beam passively-switched patch antenna array is configured to passively switch between transmitting a first of the electromagnetic beams in a first beam direction and transmitting a second of the electromagnetic beams in a second beam direction based on which of the input signals is received.

18. The system of claim 17, further comprising:

a controller configured to control which of the input signals from the at least one signal source is provided to the multi-beam passively-switched patch antenna array.

19. A method comprising:

receiving a first input signal;

dividing the first input signal into a first set of multiple sub-signals and adjusting phases of at least some of the sub-signals in the first set of sub-signals according to a first phase taper;

feeding the phase-adjusted first set of sub-signals to multiple patch antenna elements through multiple 90° hybrid transformers;

transmitting a first electromagnetic beam in a first beam direction using the patch antenna elements based on the phase-adjusted first set of sub-signals;

receiving a second input signal;

dividing the second input signal into a second set of multiple sub-signals and adjusting phases of at least some of the sub-signals in the second set of sub-signals according to a second phase taper;

feeding the phase-adjusted second set of sub-signals to the patch antenna elements through the 90° hybrid transformers, the 90° hybrid transformers isolating the first and second sets of sub-signals from each another; and transmitting a second electromagnetic beam in a second beam direction using the patch antenna elements based on the phase-adjusted second set of sub-signals;

wherein the first and second beam directions are based on the first and second phase tapers, respectively.

20. The method of claim 19, further comprising:

controlling which of the input signals is received in order to passively switch between transmitting the first electromagnetic beam and transmitting the second electromagnetic beam.

* * * * *